(12) United States Patent
Tsuchiya et al.

(10) Patent No.: US 12,454,091 B2
(45) Date of Patent: Oct. 28, 2025

(54) METHOD AND APPARATUS FOR PRODUCING RESIN CONTAINER

(71) Applicant: NISSEI ASB MACHINE CO., LTD., Nagano (JP)

(72) Inventors: Yoichi Tsuchiya, Nagano (JP); Kazuya Ishizaka, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 189 days.

(21) Appl. No.: 18/025,984

(22) PCT Filed: Sep. 15, 2021

(86) PCT No.: PCT/JP2021/033866
§ 371 (c)(1),
(2) Date: Mar. 13, 2023

(87) PCT Pub. No.: WO2022/059695
PCT Pub. Date: Mar. 24, 2022

(65) Prior Publication Data
US 2023/0347570 A1    Nov. 2, 2023

(30) Foreign Application Priority Data
Sep. 16, 2020  (JP) .................................. 2020-155082

(51) Int. Cl.
*B29C 49/22* (2006.01)
*B29C 49/06* (2006.01)
*B29C 49/64* (2006.01)

(52) U.S. Cl.
CPC .............. *B29C 49/22* (2013.01); *B29C 49/06* (2013.01); *B29C 49/6445* (2013.01)

(58) Field of Classification Search
None
See application file for complete search history.

(56) References Cited

U.S. PATENT DOCUMENTS 5,229,142 A * 7/1993 Yokobayashi ...... B29C 49/6463
425/525
8,124,202 B2   2/2012 Shi et al.
(Continued)

FOREIGN PATENT DOCUMENTS

EP   1 877 237 B    6/2009
FR   2 724 588 A1   3/1996
(Continued)

OTHER PUBLICATIONS

Supplementary European Search Report dated Sep. 2, 2024 in European family member application No. 21869381.0.
(Continued)

*Primary Examiner* — Mohammad M Ameen
(74) *Attorney, Agent, or Firm* — GREENBLUM & BERNSTEIN, P.L.C.

(57) ABSTRACT

A method of producing a resin container includes injection-molding a resin intermediate molded body of bottomed cylindrical shape as a first injection-molding, injection-molding a resin material outside the intermediate molded body as a second injection-molding, to produce a multilayer preform in which a resin layer is layered on an outer peripheral side of the intermediate molded body, and blow-molding the preform in a state of containing residual heat from injection-molding to produce a resin container having a bottom portion thicker in wall thickness than a body portion. A portion of the inner peripheral side of the intermediate molded body, the portion reaching a bottom portion of the intermediate molded body, has a tapered region in which the wall thickness increases toward the bottom portion.

4 Claims, 6 Drawing Sheets

(56) References Cited

U.S. PATENT DOCUMENTS

| | | |
|---|---|---|
| 8,192,812 B2 | 6/2012 | Shi et al. |
| 9,393,728 B2 | 7/2016 | Nakahara |
| 9,694,515 B2 | 7/2017 | Semersky et al. |
| 10,144,168 B2 | 12/2018 | Nakahara |
| 2008/0113134 A1 | 5/2008 | Shi et al. |
| 2018/0257264 A1* | 9/2018 | Kawamura ............ B29C 49/48 |

FOREIGN PATENT DOCUMENTS

| | | |
|---|---|---|
| JP | 61-258751 A | 11/1986 |
| JP | 2010-503565 A | 2/2010 |
| JP | 6230173 A | 10/2017 |
| WO | WO-97/43104 * | 11/1997 |
| WO | WO-97/43104 A1 * | 11/1997 |
| WO | 2011/142965 A1 | 11/2011 |

OTHER PUBLICATIONS

International Search Report issued Nov. 16, 2021 in International Bureau of WIPO Patent Application No. PCT/JP2021/033866, along with an English translation thereof.

Written Opinion issued Nov. 16, 2021 in International Bureau of WIPO Patent Application No. PCT/JP2021/033866, along with an English translation thereof.

* cited by examiner

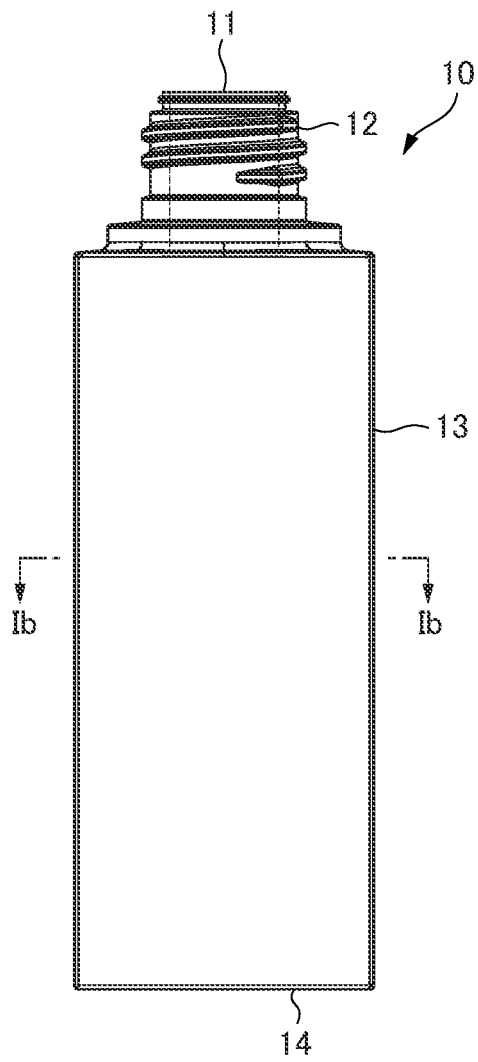
FIG. 1A
FIG. 1B
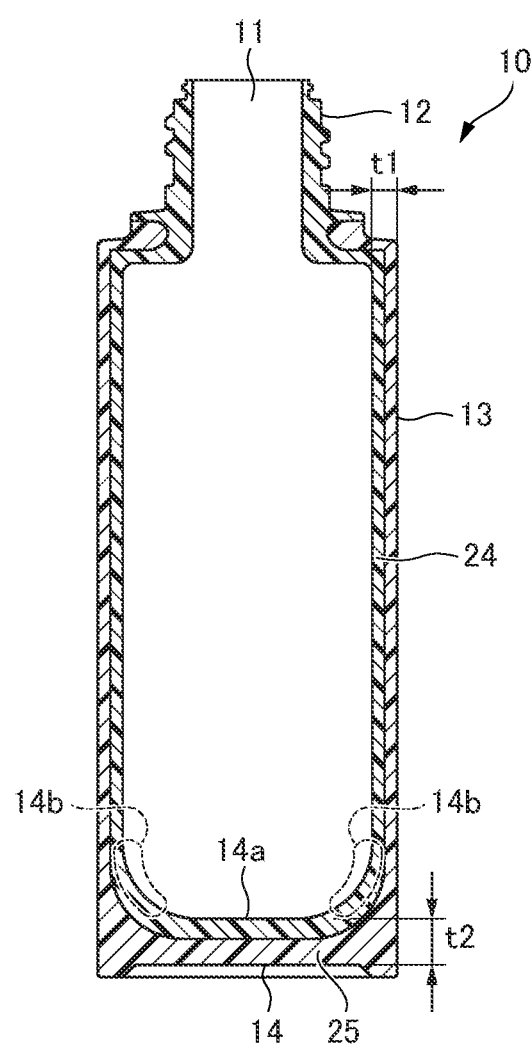
FIG. 1C

METHOD AND APPARATUS FOR PRODUCING RESIN CONTAINER

BACKGROUND OF THE INVENTION

Field of the Invention

The present invention relates to a method and an apparatus for producing a resin container.

Description of the Related Art

The container for containing cosmetics, milky lotions, and the like is required to have an appearance that can withstand aesthetic appreciation in order to increase consumer's willingness to purchase. Glass bottles having a massive feeling and a luxurious feeling and capable of maintaining a beautiful state even when used repeatedly are preferably used as containers for containing this type of cosmetics and the like. However, a glass bottle is heavy and easily broken, and costs for transportation and production are high. Therefore, it has been studied to replace a glass bottle with a resin container for a container for containing cosmetics and the like.

Herein, as one of methods of producing a resin container, a hot parison type blow-molding method has been conventionally known. In the hot parison type blow-molding method, a resin container is blow-molded using residual heat from injection molding of a preform. Therefore, it is advantageous in that it is possible to produce a resin container which is diversified and excellent in aesthetic appearance as compared with the cold parison type.

When a resin container is employed as a container for containing cosmetics or the like, it is desirable to mold the resin container into a shape in which the bottom portion is thickened and the body portion is thinned and equalized in order to emphasize a luxurious feeling and a massive feeling. When a resin container having the above-mentioned wall thickness distribution is molded by a hot parison type blow-molding method, a thick preform in which the thickness of the bottom portion is set to be the thickest is applied (see, for example, JP 6230173 A).

Since sink marks, air bubbles, whitening, and the like easily occur in the thick preform as in JP 6230173 A, it is necessary to secure a long contact time between the injection mold and the molten resin and sufficiently cool the resin. Therefore, when a thick preform is injection-molded by a hot parison type blow-molding method, it is necessary to secure a long injection-molding time (the injection time (fill time), the pressure holding time and the cooling time) for the preform. In addition, when a crystalline synthetic resin (polyethylene terephthalate or the like) is used as a material of a container or a preform, it is very difficult to mold a thick container having a bottom portion with a thickness of 5 mm or more without molding defect such as sink marks, air bubbles, or whitening by a hot parison method even if the injection molding time is lengthened in the conventional manufacturing method.

In the hot parison type blow-molding method, the rate limiting of each step in the molding cycle of the container is defined by the injection molding time of the preform. That is, when a thick preform is injection-molded, the injection-molding time of the preform, which is the rate-determining stage, is longer, and thus the molding cycle of the container also is longer.

In addition, in a case where, for example, a rectangular container having a thick bottom portion (a shape in which the bottom portion is relatively thicker than the body portion) is blow-molded by a hot parison type blow-molding method, the following problem also occurs.

First, when sufficient cooling is performed during injection molding in order to suppress whitening of a thick preform, the amount of heat (residual heat) necessary for shaping is also deprived from the preform. Since the skin layer (surface layer) of the thick preform is also formed thick (hard), the amount of heat of the preform may be insufficient even if the preform is reheated in the temperature adjustment unit. Since the bottom portion of the preform is thick in the thick bottom portion container, the body portion that is relatively thin is excessively cooled when the bottom portion is sufficiently cooled during injection-molding. Then, in the body portion, the ratio of the skin layer increases and the amount of heat significantly decreases.

As a result, an event may occur in which the edge of the corner portion and the edge of the ridge line of the container body portion is not clearly shaped during blow-molding. An aesthetic appearance is important for a container that contains a cosmetic product or the like, and low molding accuracy of the container leads to a decrease in willingness to purchase a product. Usually, the temperature of the injection mold (the injection core mold and the injection cavity mold) is uniformly set (for example, 20° C.), so that it is difficult to selectively lower the temperature of only the thick portion (bottom portion or the like) of the preform.

Second, in the inside (inner face) of the blow-molded container bottom portion, the outer peripheral portion (corner portion) can be molded in a recessed shape. For example, in a case where a rectangular container having a thick bottom portion in which cross sections of the body portion and the bottom portion are polygonal (quadrangular or the like) is formed, the bottom portion of the preform is also formed thick. In the hot parison type molding method, a thicker portion has a higher heat quantity (residual heat) and is easily stretched during blow-molding. The outside (outer face) of the container bottom portion is shaped to follow the cavity surface of the blow mold or the bottom portion mold, but the outer peripheral portion of the inside of the container bottom portion is thinner than the center portion and is recessed. That is, the cross-sectional shape of the inside (inner face) of the container bottom portion has a curved face shape in which the outer peripheral portion has a concave shape and the central portion has a convex shape.

Furthermore, the rectangular container has a different stretch ratio of the preform between the diagonal direction and the facing direction, and the stretch amount in the diagonal direction is larger than that in the facing direction. Therefore, the portion in the diagonal direction corresponding to the corner portion of the bottom portion is further stretched and thinned than the portion in the facing direction, and the recess in the vicinity of the corner portion inside the bottom portion is more remarkable. When an expensive liquid material such as perfume is contained in the container having such a shape, it is difficult to completely use the contents, and thus, the container is not easy to use.

Third, sink marks and air bubbles (voids) are likely to occur at the bottom portion of the preform (or container). As described above, conditions for injection molding of a preform having a thick bottom portion are severe, and it is particularly difficult to apply sufficient pressure holding or cooling treatment to the thick bottom portion. When the resin at the bottom portion of the preform (or container) is cooled, the cooling rate varies for each part due to a difference in density and a difference in temperature of the resin at the bottom portion, so that local abnormal shrinkage occurs, and sink marks and air bubbles are likely to occur.

In addition, cooling of the bottom portion of the container during blow-molding tends to be insufficient, and sink marks tend to occur at the bottom portion of the container after blow-molding.

SUMMARY OF THE INVENTION

A method of producing a resin container according to an aspect of the present invention includes injection-molding a resin intermediate molded body of bottomed cylindrical shape as a first injection-molding, injection-molding a resin material outside the intermediate molded body as a second injection-molding, to produce a multilayer preform in which a resin layer is layered on an outer peripheral side of the intermediate molded body, and blow-molding the preform in a state of containing residual heat from injection-molding to produce a resin container having a bottom portion thicker in wall thickness than a body portion. A portion of the inner peripheral side of the intermediate molded body, the portion reaching a bottom portion of the intermediate molded body, has a tapered region in which the wall thickness increases toward the bottom portion.

Further features of the present invention will become apparent from the following description of exemplary embodiments with reference to the attached drawings.

BRIEF DESCRIPTION OF THE DRAWINGS

FIG. 1A is a front view of a container of the present embodiment, FIG. 1B is a cross-sectional view taken along line Ib-Ib of FIG. 1A, and FIG. 1C is a longitudinal sectional view of the container of the present embodiment.

DESCRIPTION OF THE EMBODIMENTS

Figure 2A:
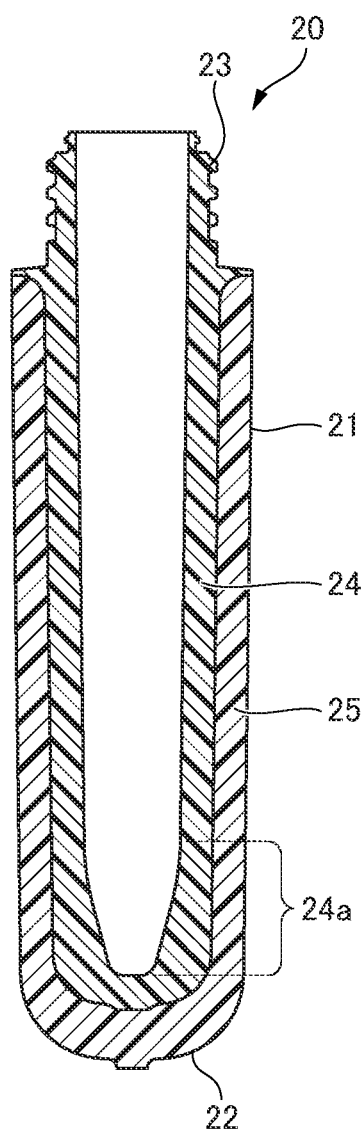
FIG. 2A is a longitudinal sectional view of a preform.

Hereinafter, embodiments of the present invention will be described with reference to the drawings.

In the embodiment, for easy understanding, structures and elements other than the main part of the present invention will be described in a simplified or omitted manner. In the drawings, the same elements are denoted by the same reference numerals. Note that the shapes, dimensions, and the like of the respective elements illustrated in the drawings are schematically illustrated, and do not indicate actual shapes, dimensions, and the like.

Configuration Example of Resin Container

First, a configuration example of a resin container (hereinafter, it is also simply referred to as a container) 10 according to the present embodiment will be described with reference to FIG. 1.

FIG. 1A is a front view of the container 10 of the present embodiment, FIG. 1B is a cross-sectional view taken along line Ib-Ib of FIG. 1A, and FIG. 1C is a longitudinal sectional view of the container 10 of the present embodiment.

As shown in FIG. 1B, the container 10 is a rectangular container having a polygonal, preferably rectangular cross-sectional shape. The container 10 is formed of, for example, a resin material such as polyethylene terephthalate (PET), and a cosmetic such as a lotion or an emulsion is contained therein.

As illustrated in FIGS. 1A and 1C, the container 10 includes a neck portion 12 having a mouth portion 11 at an upper end, a cylindrical body portion 13 continuous from the neck portion 12, and a bottom portion 14 continuous from the body portion 13. As shown in FIG. 1C, the body portion 13 and the bottom portion 14 of the container 10 have a structure in which a first layer (inner layer) 24 facing the container inner face and a second layer (outer layer) 25 facing the container outer face are layered. This structure is formed by blow-molding a preform 20 described later.

As illustrated in FIG. 1C, a wall thickness (thickness dimension) t2 of the bottom portion 14 of the container 10 is formed to be larger than a wall thickness t1 of the body portion 13. That is, the wall thickness t1 of the body portion 13 is formed to be considerably thinner than that of the bottom portion 14, and the body portion 13 has an equalized thickness. For example, the wall thickness t2 is set to twice or more, more preferably three times or more of the wall thickness t1. At the bottom portion 14, the second layer (outer layer) 25 is preferably set to be thicker than the first layer (inner layer) 24. The wall thickness t1 of the body portion 13 is formed to be, for example, 1.5 to 6 mm (preferably 2 to 4 mm), and the wall thickness t2 of the bottom portion 14 is formed to be, for example, 4 to 20 mm (preferably 6 to 12 mm, more preferably 8 to 10 mm).

By forming the container 10 into a shape having the above-described wall thickness distribution, a luxurious feeling and a massive feeling are emphasized, and the container 10 can conform to an image of a cosmetic container held by a consumer. That is, since the aesthetic appearance of the container 10 can be enhanced, the container 10 can be used as a cosmetic container or the like whose appearance is important.

As shown in FIG. 1C, a central portion 14a of the inner face of the bottom portion of the container 10 is formed in a substantially flat shape. At the inner face of the bottom portion of the container 10, an outer edge portion 14b (a portion located on the outer peripheral side of the inner face of the bottom portion and adjacent to the inner face of the body portion) is thicker than the central portion 14a. The outer edge portion 14b of the bottom portion inner face connects the bottom portion 14 and the body portion 13 in a curved shape without being recessed toward the bottom side or the outer side when viewed from the central portion 14a. This makes it difficult for the content liquid to remain at the outer edge portion 14b of the bottom portion inner face when the remaining amount of the content liquid is small, and it is easy to use up the content liquid to the end.

In addition, at the bottom portion 14, it is preferable that the central portion 14a of the bottom portion inner face of each of the second layer (outer layer) 25 and the first layer (inner layer) 24 be formed in a substantially flat shape. In addition, at the bottom portion 14, it is preferable that the outer edge portion 14b of the bottom portion inner face of each of the second layer (outer layer) 25 and the first layer (inner layer) 24 are formed in a curved shape having no recess on the bottom side or the outer side. Note that the longitudinal cross section of the inner face of the bottom portion of the container 10 may have a curved shape in which the central portion is recessed relative to the outer edge portion.

Configuration Example of Preform

FIG. 2 show an example of the preform 20 applied to the production of the container 10 of the present embodiment.

Figure 2B:
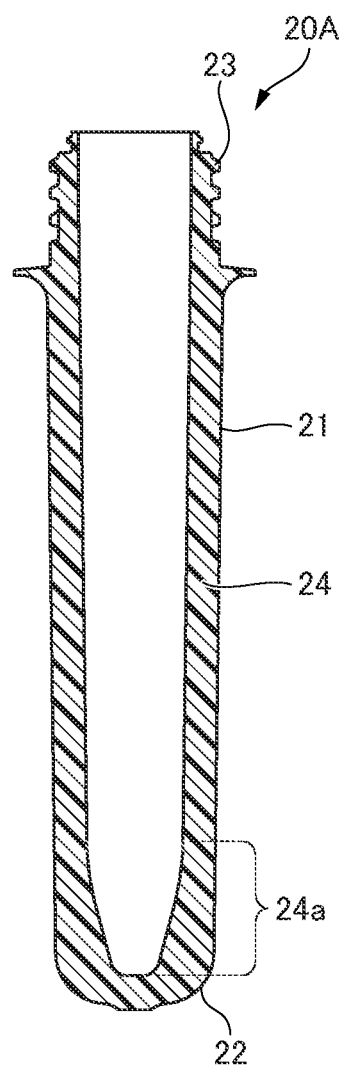
FIG. 2B is a longitudinal sectional view of an intermediate molded body of the preform.

FIG. 2A is a longitudinal sectional view of the preform 20, and FIG. 2B is a longitudinal sectional view of an intermediate molded body 20A of the preform 20.

The entire shape of the preform 20 is a bottomed cylindrical shape in which one end is opened and the other end is closed. The preform 20 includes a body portion 21 formed in a cylindrical shape, a bottom portion 22 that closes the other end of the body portion 21, and a neck portion 23 with an opening at one end of the body portion 21.

In addition, the preform 20 has a structure in which the first layer (inner layer) 24 located on the inner peripheral side and the second layer (outer layer) 25 located on the outer peripheral side are layered. The neck portion 23 is made of the material of the first layer 24, but at the body portion 21 and the bottom portion 22, the second layer 25 is layered on the outer periphery of the first layer 24.

The wall thickness of the body portion 21 of the second layer 25 is substantially constant in the axial direction. On the other hand, a portion, of the body portion 21 of the first layer 24, reaching the bottom portion 22 has, on the inner peripheral side, a tapered region (wall thickness gradually increasing region) 24a in which the wall thickness of the body portion 21 increases toward the bottom portion 22 is formed. Here, the outer diameter of the body portion 21 of the first layer 24 is substantially constant in the axial direction, and the inner peripheral face of the tapered region 24a has a shape tapered toward the bottom portion 22. Therefore, the inner peripheral face of the tapered region 24a has a substantially truncated cone shape. In the preform 20, the amount of increase in the wall thickness of the tapered region 24a may be changed between a portion corresponding to the diagonal direction and a portion corresponding to the facing direction of the container 10 (for example, at the tapered region 24a, the corresponding portion in the diagonal direction is made thicker than the corresponding portion in the facing direction).

The wall thickness of the body portion 21 of the preform 20 (the sum of the thicknesses of the body portions of the first layer 24 and the second layer 25) is set to, for example, 4 to 10 mm (preferably 6 to 8 mm), and the wall thickness of the bottom portion 22 (the sum of the thicknesses of the bottom portions of the first layer 24 and the second layer 25) excluding the tapered region 24a is set to, for example, 8 to 20 mm (preferably 10 to 16 mm). At the second layer 25 of the preform 20, the wall thickness of the bottom portion 22 is set to, for example, 2.0 times or less the wall thickness of the body portion 21 and 10 mm or less. At the first layer 24 of the preform 20, the wall thickness of the bottom portion 22 excluding the tapered region 24a is set to 2.0 times or less, preferably 1.5 times or less the wall thickness of the body portion 21 and 6 mm or less.

In this manner, by forming the tapered region 24a in the first layer 24, a portion corresponding to the outer edge portion 14b of the bottom portion inner face of the container 10 is thick in the preform 20.

The preform 20 in FIG. 2A is formed as follows. First, the intermediate molded body 20A (FIG. 2B) having the body portion 21, the bottom portion 22, and the neck portion 23 is injection-molded using the material of the first layer 24. Thereafter, the material of the second layer 25 is further injection molded on the outer peripheries of the body portion 21 and the bottom portion 22 of the intermediate molded body 20A to form the preform 20.

Here, the compositions of the materials of the first layer 24 and the second layer 25 may be the same or different. For example, the same resin material may be used for the first layer 24 and the second layer 25, or different materials may be used. Furthermore, for example, the amount of coloring material (color shade), the type of coloring material (color type), and the like may be changed for each material of the first layer 24 and the second layer 25. Note that the first layer 24 or the second layer 25 may have a property of transmitting light (translucency).

The dimensions and specifications of the preform 20, for example, the thicknesses of the first layer 24 and the second layer 25 can be appropriately changed according to the shape of the container 10 to be produced. The axial length of the preform 20 (the length from the upper end of the neck portion 23 to the lower end of the second layer 25 of the bottom portion 22) is preferably set to be longer than that of the container 10.

<Description of Apparatus for Producing Container>

Figure 3:
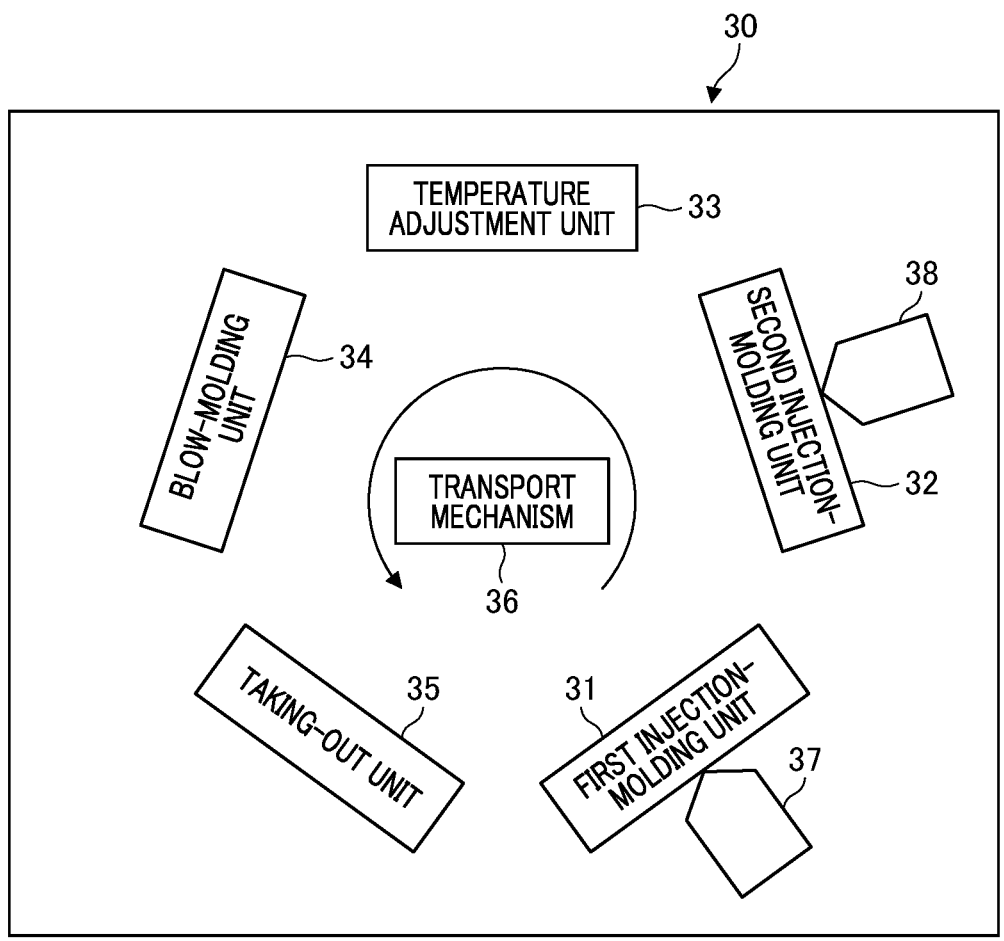
FIG. 3 is a diagram schematically illustrating a configuration of a blow-molding apparatus according to the present embodiment.

FIG. 3 is a diagram schematically illustrating a configuration of a blow-molding apparatus 30 according to the present embodiment. The blow-molding apparatus 30 is an example of an apparatus for producing a container, and employs a hot parison type method (also referred to as a one-stage method) in which a container is blow-molded by utilizing residual heat (internal heat) from injection molding without cooling the preform 20 to room temperature.

The blow-molding apparatus 30 includes at least a first injection-molding unit 31, a second injection-molding unit 32, a temperature adjustment unit 33, a blow-molding unit 34, a taking-out unit 35, and a transport mechanism 36. The first injection-molding unit 31, the second injection-molding unit 32, the temperature adjustment unit 33, the blow-molding unit 34, and the taking-out unit 35 are disposed at positions rotated at predetermined angle intervals (for example, 72 degrees) about the transport mechanism 36.

(Transport Mechanism 36)

The transport mechanism 36 includes a transfer plate (not illustrated) that moves in a rotation direction around an axis in a direction perpendicular to the paper surface of FIG. 3. The transfer plate is composed of a single disk-shaped flat plate member or a plurality of substantially fan-shaped flat plate members divided for each forming station. In the transfer plate, one or more neck molds 36a (not illustrated in FIG. 3) for holding the neck portion 23 of the preform 20 (or the neck portion 12 of the container 10) are disposed at each predetermined angle.

The transport mechanism 36 includes a rotation mechanism (not illustrated), and moves the transfer plate to transport the preform 20 (or the container 10) whose neck portion 23 is held by the neck mold 36a to the first injection-molding unit 31, the second injection-molding unit 32, the temperature adjustment unit 33, the blow-molding unit 34, and the taking-out unit 35 in this order. Note that the transport mechanism 36 further includes a lifting and lowering mechanism (vertical mold opening/closing mechanism) and a mold opening mechanism for the neck mold, and also performs an operation of lifting and lowering the transfer plate and an operation related to mold closing and mold opening (releasing) in the first injection-molding unit 31, the second injection-molding unit 32, and the like.

(First Injection-Molding Unit 31)

The first injection-molding unit 31 includes an injection cavity mold (first injection cavity mold) and an injection core mold (first injection core mold) (both not illustrated), and produces the intermediate molded body 20A of the preform 20 illustrated in FIG. 2B. A first injection device 37 that supplies a raw material (resin material, synthetic resin) of the first layer 24 of the preform 20 is connected to the first injection-molding unit 31.

In the first injection-molding unit 31, the injection cavity mold, the injection core mold, and the neck mold 36a of the transport mechanism 36 are closed to form a mold space for the intermediate molded body 20A. Then, by pouring the resin material from the first injection device 37 into the mold space, the intermediate molded body 20A (FIG. 2B) corresponding to the first layer 24 of the preform 20 is produced in the first injection-molding unit 31.

Here, the raw material of the first layer 24 is a thermoplastic synthetic resin, and can be appropriately selected according to the specification of the container 10. Specific examples of the material include PET, PEN (polyethylene naphthalate), PCTA (Polycyclohexylenedimethylene terephthalate), Tritan (Tritan (registered trademark): copolyester manufactured by Eastman Chemical), PP (polypropylene), PE (polyethylene), PC (polycarbonate), PES (polyethersulfone), PPSU (polyphenylsulfone), PS (polystyrene), COP/COC (cyclic olefin polymer), PMMA (polymethyl methacrylate: acrylic), and PLA (polylactic acid). In addition, an additive such as a coloring material may be added to the resin material. In addition, the raw material of the first layer 24 (or the second layer 25) is preferably a thermoplastic crystalline resin capable of ensuring the transparency of the container 10 which is a final molded product.

Even when the mold of the first injection-molding unit 31 is opened, the neck mold of the transport mechanism 36 is not released, and the intermediate molded body 20A is held and transported as it is. The number (that is, the number of containers 10 that can be simultaneously molded by the blow-molding apparatus 30) of the intermediate molded bodies 20A simultaneously molded by the first injection-molding unit 31 can be appropriately set.

(Second Injection-Molding Unit 32)

The second injection-molding unit 32 includes an injection cavity mold (not illustrated), and injection-molds the second layer 25 on the outer peripheral portion of the intermediate molded body 20A. A second injection device 38 that supplies a raw material (resin material) of the second layer 25 of the preform 20 is connected to the second injection-molding unit 32.

In the second injection-molding unit 32, after the intermediate molded body 20A is accommodated in the injection cavity mold, a resin material is injected from the second injection device 38 between the outer periphery of the intermediate molded body 20A and the injection cavity mold. As a result, in the second injection-molding unit 32, the second layer 25 is formed on the outer peripheral portion of the intermediate molded body 20A, and the preform 20 in FIG. 2A is produced.

The raw material of the second layer 25 is a thermoplastic synthetic resin, and the specific type of the material is the same as in the description of the raw material of the first layer 24. The composition of the raw material of the second layer 25 may be the same as or different from that of the first layer 24. For example, the same resin material may be used for the first layer 24 and the second layer 25, or different materials may be used. Furthermore, for example, the amount of coloring material, the type of coloring material, and the like may be changed for each material of the first layer 24 and the second layer 25.

(Temperature Adjustment Unit 33)

The temperature adjustment unit 33 equalizes or removes uneven temperature of the preform 20 transported from the second injection-molding unit 32, and further adjusts temperature distribution to adjust the temperature of the preform 20 to a temperature suitable for final blowing (for example, about 90° C. to 105° C.). The temperature adjustment unit 33 also has a function of cooling the preform 20 in a high temperature state after injection molding.

Figure 4:
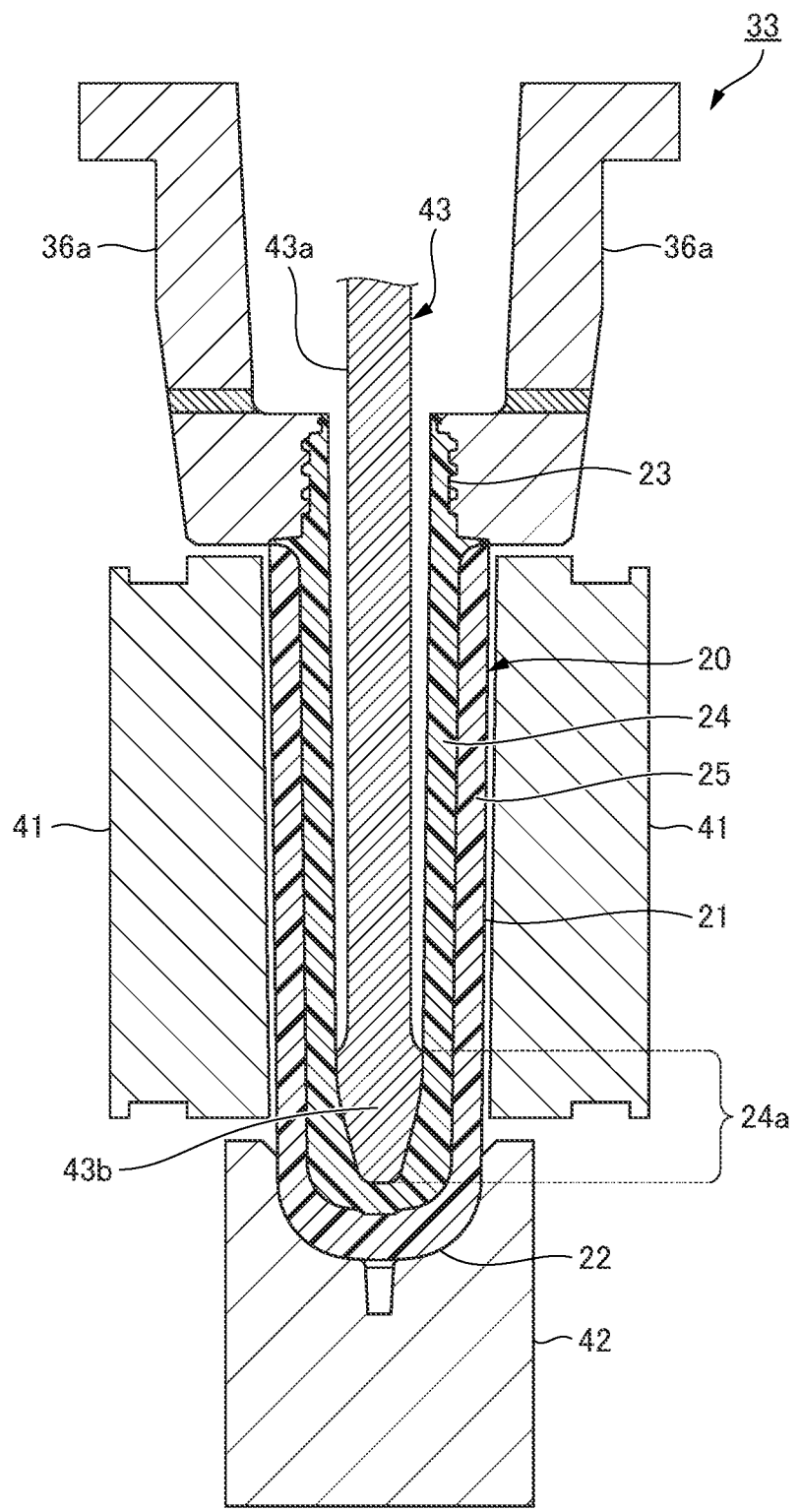
FIG. 4 is a diagram illustrating a configuration example of a temperature adjustment unit.

FIG. 4 is a diagram illustrating a configuration example of the temperature adjustment unit 33. The temperature adjustment unit 33 includes a first mold (heating pot 41) that accommodates the body portion 21 of the preform 20, a second mold (temperature adjustment pot 42) that faces the outer face of the bottom portion 22 of the preform 20, and a third mold (temperature adjustment rod 43) that is inserted into the preform 20. Although not particularly limited, it is preferable that the first mold (heating pot 41) and the second mold (temperature adjustment pot) are integrated and configured as a single temperature adjustment cavity mold.

In the heating pot 41, the mold is maintained at a predetermined temperature by, for example, installing a heater or forming a flow path through which a temperature control medium flows. The heating pot 41 has an internal space that accommodates the body portion 21 of the preform 20 in a non-contact state at a predetermined interval in the radial direction, and heats the body portion 21 of the preform 20 with radiant heat from the outside. In the temperature adjustment unit 33, the body portion 21 of the preform 20 facing the heating pot 41 is adjusted to have a high temperature relative to the bottom portion 22.

The temperature adjustment pot 42 is a mold having a shape corresponding to the bottom portion 22 of the preform 20, and has a function of cooling the bottom portion 22 of the preform 20 by contacting it from the outside. The temperature adjustment pot 42 is disposed below the heating pot 41 and comes into surface contact with the bottom portion 22 of the preform 20 to release heat of the bottom portion 22 and perform cooling.

The temperature adjustment rod 43 includes a main body 43a extending in the axial direction and a pressing portion 43b formed at a distal end of the main body 43a. The temperature adjustment rod 43 has a function of pressing the preform 20 toward the temperature adjustment pot 42 and pressing the bottom portion 22 of the preform 20 against the temperature adjustment pot 42.

The outer diameter of the main body 43a is smaller than the inner diameter of the first layer 24 of the preform 20. Therefore, when the temperature adjustment rod 43 is inserted into the first layer 24, the main body 43a does not come into contact with the body portion 21 of the first layer 24.

The distal end of the pressing portion 43b is formed in a tapered shape corresponding to the shape of the tapered region 24a. When the temperature adjustment rod 43 is inserted into the first layer 24, the pressing portion 43b formed at the distal end of the main body 43a is in close contact with the tapered region 24a of the first layer 24, and heat exchange between the pressing portion 43b and the tapered region 24a is performed. Furthermore, by pushing the temperature adjustment rod 43 downward in this state, the bottom portion 22 of the preform 20 is pressed against the upper mold surface of the temperature adjustment pot 42.

(Blow-Molding Unit 34)

The blow-molding unit 34 blow-molds the preform 20 whose temperature has been adjusted by the temperature adjustment unit 33 to produce the container 10.

The blow-molding unit 34 includes a blow cavity mold which is a pair of split molds corresponding to the shape of the container 10, a bottom mold, a stretching rod, and an air introduction member (all not illustrated). The blow-molding unit 34 blow-molds the preform 20 while stretching the preform. As a result, the preform 20 is shaped into a blow-cavity shape, and the container 10 can be produced.

(Taking-Out Unit 35)

The taking-out unit 35 is configured to release the neck portion 12 of the container 10 produced by the blow-molding unit 34 from the neck mold 36a and take out the container 10 to the outside of the blow-molding apparatus 30.

<Description of Method of Producing Container>

Figure 5:
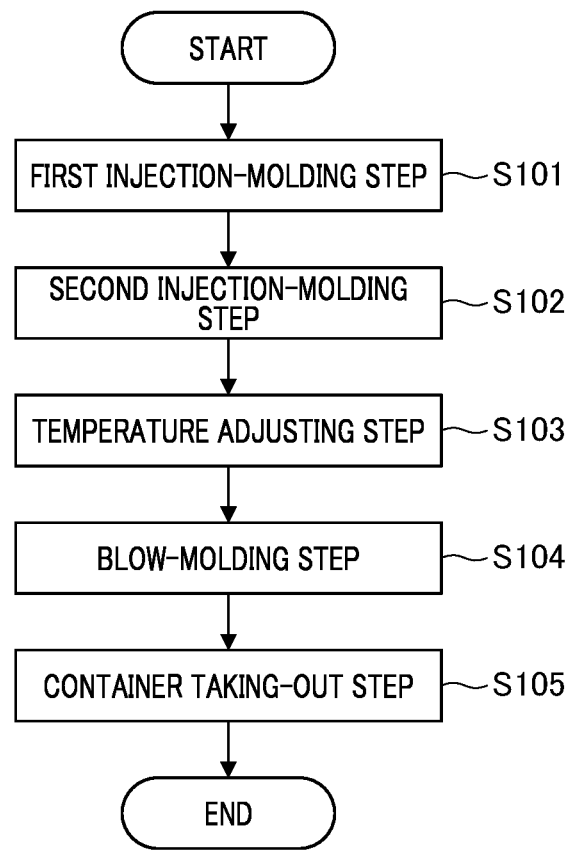
FIG. 5 is a flowchart showing steps of a method of producing a container.

Next, a method of producing a container by the blow-molding apparatus 30 of the present embodiment will be described. FIG. 5 is a flowchart illustrating steps of the container production method.

(Step S101: First Injection-Molding Step)

First, in the first injection-molding unit 31, the resin material is injected from the first injection device 37 into the mold space, for the intermediate molded body 20A, formed by the injection cavity mold (first injection cavity mold), the injection core mold (first injection core mold) having the tapered portion on the distal end side, and the neck mold 36a of the transport mechanism 36, and the intermediate molded body 20A corresponding to the first layer 24 of the preform 20 is produced.

As shown in FIG. 2B, the tapered region 24a in which the wall thickness of the body portion 21 increases toward the bottom portion 22 is formed at the inner peripheral side of the intermediate molded body 20A.

Thereafter, when the mold of first injection-molding unit 31 is opened, the transfer plate of the transport mechanism 36 moves by a predetermined angle, and the intermediate molded body 20A held by the neck mold 36a is transported to the second injection-molding unit 32 in a state of containing residual heat from injection molding.

(Step S102: Second Injection-Molding Step)

Subsequently, in the second injection-molding unit 32, the intermediate molded body 20A is accommodated in the injection cavity mold (second injection cavity mold), and then a resin material is injected from a second injection device 38 between the outer periphery of the intermediate molded body 20A and the injection cavity mold. As a result, the second layer 25 is formed on the outer peripheral portion of the intermediate molded body 20A, and the preform 20 is produced.

Here, when injection molding is performed by the second injection-molding unit 32, a core mold (second injection core mold, not shown) conforming to the inner face shape of the intermediate molded body 20A is inserted into the intermediate molded body 20A in order to maintain the shape of the intermediate molded body 20A. When the intermediate molded body 20A comes into contact with the core mold of the second injection-molding unit 32, additional cooling of the first layer 24 including the tapered region 24a is performed, and excessive residual heat of the first layer 24 is reduced.

Thereafter, when the mold of the second injection-molding unit 32 is opened, the transfer plate of the transport mechanism 36 moves by a predetermined angle, and the preform 20 held by the neck mold 36a is transported to the temperature adjustment unit 33 in a state of containing residual heat from injection molding.

(Step S103: Temperature Adjusting Step)

Subsequently, the temperature adjustment unit 33 performs temperature adjustment for bringing the temperature of the preform 20 close to a temperature suitable for the final blow.

The temperature adjustment unit 33 accommodates the preform 20 in the heating pot 41 (or the temperature adjustment cavity mold), and inserts the temperature adjustment rod 43 into the preform 20. The body portion 21 of the preform 20 is subjected to temperature adjustment by being heated by the heating pot 41 facing the body portion 21. Since the main body 43a of the temperature adjustment rod 43 is not in contact with the first layer 24, it does not greatly affect the temperature adjustment of the first layer 24. When the preform 20 is accommodated in the heating pot 41, the bottom portion 22 of the preform 20 may be brought into contact with the temperature adjustment pot 42 for cooling.

In addition, in the body portion 21 of the preform 20, in particular, the first layer 24 comes into contact two times with the injection molds of the first injection-molding unit 31 and the second injection-molding unit 32, and the amount of heat decreases. Therefore, the body portion 21 can replenish the amount of heat necessary for shaping (blow-molding) by being heated by the first mold (heating pot 41).

On the other hand, the pressing portion 43b of the temperature adjustment rod 43 is in close contact with (contacts) the tapered region 24a of the first layer 24, and heat exchange between the pressing portion 43b and the tapered region 24a is performed. Furthermore, when the temperature adjustment rod 43 is pushed downward in this state, the bottom portion 22 of the preform 20 is pressed against the temperature adjustment pot 42. Then, the bottom portion 22 of the preform 20 is sandwiched between the temperature adjustment pot 42 and the temperature adjustment rod 43 and is subjected to be cooled by contact.

As a result, the temperature of the bottom portion 22 and the tapered region 24a of the preform 20 is adjusted to be lower than that of the body portion 21. That is, the body portion 21 of the preform 20 has a large amount of residual heat, and the bottom portion 22 and the tapered region 24a of the preform 20 have a small amount of residual heat. After the temperature adjustment rod 43 is inserted into the preform 20, the heating pot 41 and the temperature adjustment pot 42 (or the temperature adjustment cavity mold) may be raised to accommodate the preform 20 in the pot.

Thereafter, the transfer plate of the transport mechanism 36 moves by a predetermined angle, and the preform 20 after the temperature adjustment held in the neck mold 36a is transported to the blow-molding unit 34.

(Step S104: Blow-Molding Step)

Subsequently, in the blow-molding unit 34, blow-mold is performed to produce the container 10.

First, the blow cavity mold is closed, the preform 20 is accommodated in the mold space, and an air introduction member (blow core) is lowered, so that the air introduction member contacts the neck portion 23 of the preform 20. Then, the preform 20 is laterally axially stretched by lowering the stretching rod (longitudinal axis stretching member) to hold the bottom portion 22 of the preform 20 from the inner face and supplying blow air from the air introduction member while performing longitudinal axis stretching as necessary. As a result, the preform 20 is bulged and shaped so as to be in close contact with the mold space of the blow cavity mold, and is blow-molded into the container 10. Note that the bottom portion mold stands by at a lower position where it is not in contact with the bottom portion 22 of the preform 20 before closing the blow-cavity mold, and quickly rises to the molding position before closing the mold or after closing the mold.

In the hot parison type blow-molding, the preform 20 is more easily deformed as the internal heat quantity of the preform 20 is larger. As described above, the body portion 21 of the preform 20 facing the heating pot 41 has a large amount of residual heat, while the bottom portion 22 and the tapered region 24a of the preform 20 that have been cooled by contact with the temperature adjustment pot 42 have a small amount of residual heat. That is, in the preform 20, the body portion 21 having a larger internal heat quantity is more easily deformed than the bottom portion 22.

Therefore, when the blow air is supplied to the preform 20, the body portion 21 having a large internal heat quantity is stretched earlier, and the bottom portion 22 having a small internal heat quantity is stretched later. This makes it difficult for the bottom portion 22 of the preform 20 to be stretched, so that the bottom portion 14 of the container 10 shaped by blow-molding can be thickened.

In addition, the tapered region 24a in which the wall thickness of the first layer 24 increases toward the bottom portion 22 is formed in the vicinity of the bottom portion of the preform 20. Since the tapered region 24a is cooled by contact with the temperature adjustment rod 43, and the tapered region 24a is also cooled from the outside by the temperature adjustment pot 42, it has a smaller amount of residual heat than the body portion 21, and is hardly deformed. Therefore, at the time of blow-molding, the resin for the tapered region 24a remains at the bottom portion 14 of the container 10, and the outer edge portion 14b of the bottom portion inner face of the container 10 is thicker than the central portion 14a as illustrated in FIG. 1C.

Specifically, when the cross-sectional shape of the body portion and the bottom portion of the container 10 is a polygonal shape (quadrangular shape), the recess of the outer edge portion 14b corresponding to the diagonal region can be reliably suppressed in the inner face shape of the container bottom portion. That is, at the inner face of the container bottom portion, sink marks and a decrease in wall thickness due to stretching from the central portion 14a to the outer edge portion 14b are suppressed, so that the inner face shape of the container bottom portion can be formed flat.

(Step S105: Container Taking-Out Step)

When the blow-molding is completed, the blow cavity mold is opened. As a result, the container 10 is movable from the blow-molding unit 34.

Subsequently, the transfer plate of the transport mechanism 36 moves by a predetermined angle, and the container 10 is transported to the taking-out unit 35. In the taking-out unit 35, the neck portion 12 of the container 10 is released from the neck mold 36a, and the container 10 is taken out of the blow-molding apparatus 30.

Thus, one cycle in the method of producing the container ends. Thereafter, by moving the transfer plate of the transport mechanism 36 by a predetermined angle, the respective steps of S101 to S105 described above are repeated. During the operation of the blow-molding apparatus 30, at least five sets of containers each having a time difference in one step are produced in parallel.

Further, due to the structure of the blow-molding apparatus 30, the respective times of the first injection-molding step, the second injection-molding step, the temperature adjusting step, the blow-molding step, and the container taking-out step are the same. Similarly, the transport time between the steps is the same.

As described above, in the present embodiment, the intermediate molded body 20A corresponding to the first layer 24 of the preform 20 is injection-molded in the first injection-molding step, and the second layer 25 is injection-molded on the outer peripheral portion of the intermediate molded body 20A in the second injection-molding step to produce the multilayer preform 20. Then, in the blow-molding step, the preform 20 is blow-molded to produce the container 10 in which the wall thickness t2 of the container bottom portion is thicker than the wall thickness t1 of the container body portion. Specifically, in a container in which the cross-sectional shape of the body portion or the bottom portion is a polygonal shape (for example, a quadrangular shape) and the wall thickness t2 of the bottom portion is thicker than the wall thickness t1 of the body portion, it is possible to favorably produce a container in which sink marks and a decrease in wall thickness due to stretching from the central portion 14a to the outer edge portion 14b are suppressed and the bottom portion inner face shape is flat.

When the thick container 10 suitable for a cosmetic container or the like is produced by a hot parison type blow-molding method, it is necessary to use a thick preform corresponding to the wall thickness of the container bottom portion. In the present embodiment, the thick preform 20 is produced by two injection-molding steps. Therefore, the injection molding time in each of the first injection-molding step and the second injection-molding step is shorter than the injection molding time when the thick preform is molded in one injection-molding step. As a result, the injection molding time of the preform, which is the rate-determining stage, is shortened, so that the molding cycle can be shortened when the thick container 10 suitable for a cosmetic container or the like is produced.

In addition, in the present embodiment, since the thick preform 20 is produced in two injection-molding steps, the preforms injected in the first injection-molding step and the second injection-molding step can be made thin, and the degree of difficulty in molding is also reduced, as compared with the case where the thick preform is molded in one injection-molding step. That is, in the present embodiment, it is possible to sufficiently apply cooling and pressure holding processing to the bottom portion having a relatively large thickness in the preform. Therefore, the bottom portion, of the preform, relatively thicker than the body portion and the like can also be sufficiently cooled, so that generation of sink marks and air bubbles can be suppressed, and the quality of the container 10 can be improved. In addition, whitening (crystallization) due to insufficient cooling hardly occurs due to cooling in the mold in the first injection-molding step and the second injection-molding step, so that the quality of the container 10 can be improved.

Specifically, in the preform 20 and the container 10, the core layer (internal layer) tends to be insufficient in cooling, but the preform 20 and the container 10 in the present embodiment have the first layer 24 and the second layer 25. Since the first layer 24 and the second layer 25 each have core layers adjacent to the respective skin layers, the core layers are divided in the entire preform 20. Then, the core layer of the first layer 24 is cooled by a first injection cavity mold or the like. As a result, whitening can be suppressed even by cooling for a shorter time than before.

In the present embodiment, since the thick preform 20 is produced by two injection-molding steps, parameters such as the cooling time can be adjusted separately for the inner layer and the outer layer. Therefore, as compared with the case where the thick preform is molded in one injection-molding step, the amount of heat on the outer layer side is easily adjusted, and the amount of heat is easily left in the second layer, which is the outer side of the preform 20. As a result, it is easy to clearly shape the edge of the corner portion and the edge of the ridge line of the container body portion by blow-molding, and the quality of the container 10 can be improved.

In the present embodiment, the tapered region 24a in which the wall thickness of the first layer 24 increases toward the bottom portion 22 is formed in the vicinity of the bottom portion of the preform 20. Therefore, since the resin for the tapered region 24a remains at the bottom portion 14 of the container 10 at the time of blow-molding, the outer edge portion 14b of the bottom portion inner face of the container 10 can be made thicker than the central portion 14a. In the container 10, when the remaining amount of the content liquid is small, the content liquid is less likely to remain in the outer edge portion 14b of the inner face of the bottom portion, and the content liquid is easily used up to the end.

In addition, in the temperature adjusting step of the present embodiment, the bottom portion 22 and the tapered region 24a of the preform 20 are cooled by contact with a mold, and have a smaller amount of residual heat than the body portion 21 of the preform 20. As a result, the body portion 21 having a large internal heat quantity is stretched earlier, the bottom portion 22 and the tapered region 24a having a small internal heat quantity are stretched later, and it is easier to mold the bottom portion 14 of the container 10 into a desired shape.

In the present embodiment, since the thick preform 20 is produced by two injection-molding steps, the composition of the material of the first layer 24 on the inner peripheral side of the preform 20 and the composition of the material of the second layer 25 on the outer peripheral side can be made different. As a result, it is possible to suppress the production cost of the container 10 and to produce the container 10 having high designability.

For example, when the container 10 is internally colored with a coloring material, the production cost can be reduced by suppressing the addition amount of the coloring material of the first layer 24 or the second layer 25. For example, the coloring material may be added only to the material of the first layer 24.

In addition, the design of the container 10 may be improved by changing the pattern of color or figure between the first layer 24 and the second layer 25. In addition, a difference in refractive index may be generated between the first layer 24 and the second layer 25, and light scattering due to internal reflection may occur at the interface between the first layer 24 and the second layer 25.

The present invention is not limited to the above embodiments, and various improvements and design changes may be made without departing from the gist of the present invention.

For example, the container produced by the production method of the present invention is not limited to a rectangular container having a quadrangular cross section as in the above embodiment. For example, it is also possible to blow-mold a container or the like having a polygonal cross section of a triangular shape, a pentagon shape or more, or an elliptical cross section using the preform having the tapered region of the above embodiment.

Figure 6:
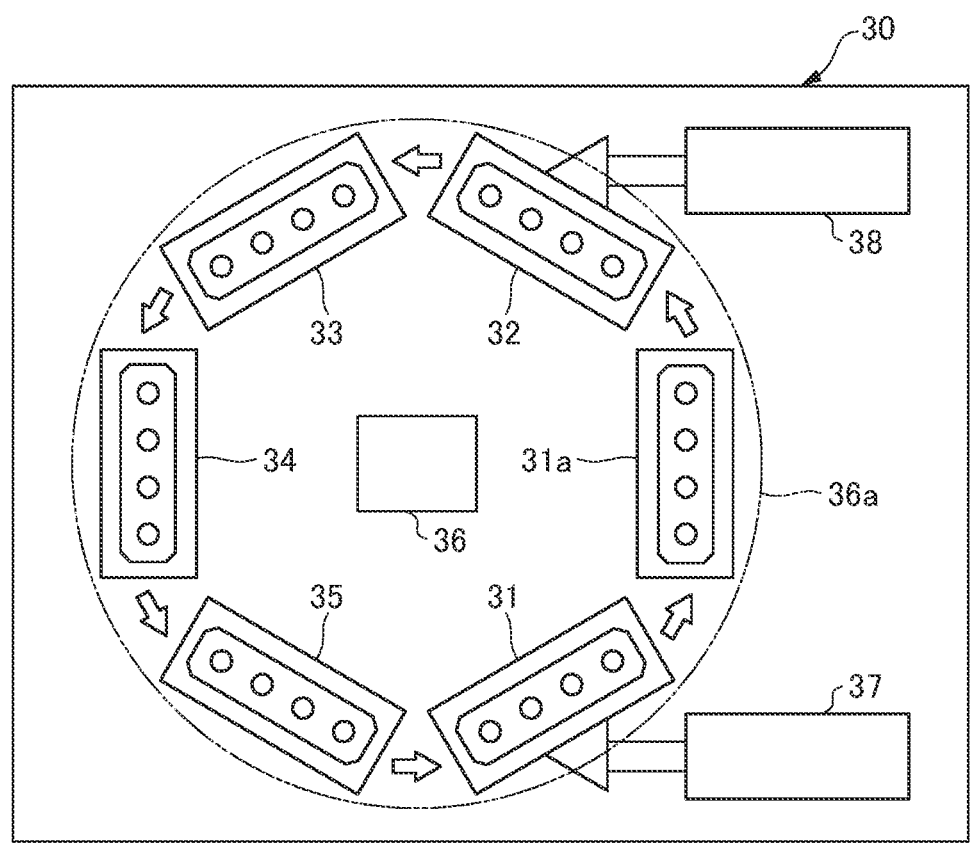
FIG. 6 is a diagram illustrating another configuration example of the blow-molding apparatus.

The configuration of the blow-molding apparatus 30 is not limited to the configuration of FIG. 3. For example, as illustrated in FIG. 6, the blow-molding apparatus 30 may further include a temperature adjustment unit (second temperature adjustment unit) 31a that can heat or cool only the first layer 24 of the preform 20 between the first injection-molding unit 31 and the second injection-molding unit 32. In this case, respective molding stations are disposed at positions rotated at 60 degree intervals about the transport mechanism 36. Then, the preform 20 is sequentially transported to each molding station by the transfer plate 36a of the transport mechanism 36. As in the temperature adjustment unit 31, a temperature adjustment unit 31b preferably includes a first mold (heating pot 41), a second mold (temperature adjustment pot 42), and a third mold (temperature adjustment rod 43). However, when the thickness of the bottom portion of the intermediate molded body 20A (first layer 24) is substantially the same as that of the body portion (for example, when the thickness of the bottom portion is 0.7 to 1.3 times the thickness of the body portion), the temperature adjustment unit 31b may include only the first mold (heating pot 41) and the third mold (temperature adjustment rod 43). Further, the configuration of the blow-molding apparatus 30 of FIG. 6 is preferably similar to that of FIG. 3 except for the temperature adjustment unit 31b.

In addition, the embodiments disclosed herein should be considered in all respects as illustrative and not restrictive. The scope of the present invention is indicated not by the above description but by the claims, and it is intended that meanings equivalent to the claims and all modifications within the scope are included.

What is claimed is:

1. A method of producing a resin container, the method comprising:
    injection-molding a resin intermediate molded body of bottomed cylindrical shape as a first injection-molding;
    injection-molding a resin material on an outer side of the intermediate molded body as a second injection molding, to produce a multilayer preform in which a resin layer is layered on an outer peripheral side of the intermediate molded body;
    blow-molding the preform in a state of containing residual heat from injection-molding to produce a resin container having a bottom portion thicker in wall thickness than a body portion, wherein
    a portion of an inner peripheral side of the intermediate molded body, the portion reaching a bottom portion of the intermediate molded body, has a tapered region in which a wall thickness increases toward the bottom portion; and
    the wall thickness of the bottom portion of an outer layer in the multilayer preform is set to be thicker than the wall thickness of the bottom portion of an inner layer excluding the tapered region.

2. A method of producing the resin container according to claim 1, wherein
    at an inner face of a bottom portion of the resin container, an outer edge portion is thicker than a central portion.

3. A method of producing the resin container according to claim 1, the method further comprising:
    adjusting a temperature of the preform produced during the second injection-molding before the blow-molding as temperature adjusting, wherein
    during the temperature adjusting, a temperature of the tapered region and a temperature of the bottom portion adjust to a temperature lower than a temperature of the body portion.

4. The method of producing a resin container according to claim 3, wherein during the temperature adjusting,
the body portion heats by a first mold facing a body portion of the preform, and
the preform sandwiches between a second mold facing an outer face of a bottom portion of the preform and a third mold inserted into the preform, to cool the tapered region and the bottom portion.

\* \* \* \* \*